US008312968B2

(12) United States Patent
Iwasaki et al.

(10) Patent No.: US 8,312,968 B2
(45) Date of Patent: Nov. 20, 2012

(54) AUTOMATIC TRANSMISSION (75) Inventors: Tatsuhiko Iwasaki, Hiroshima (JP);
Masako Shinohara, Hiroshima (JP)

(73) Assignee: Mazda Motor Corporation (JP)

( * ) Notice: Subject to any disclaimer, the term of this patent is extended or adjusted under 35 U.S.C. 154(b) by 187 days.

(21) Appl. No.: 12/427,940

(22) Filed: Apr. 22, 2009

(65) Prior Publication Data
US 2010/0011896 A1    Jan. 21, 2010

(30) Foreign Application Priority Data

Jul. 18, 2008   (JP) ................................ 2008-186671

(51) Int. Cl.
 F16C 3/14        (2006.01)
 F01M 1/00        (2006.01)
 F01M 11/02       (2006.01)
 F16N 21/00       (2006.01)
 F16H 57/04       (2010.01)

(52) U.S. Cl. ................. 184/1.5; 184/6; 184/8; 184/11.2; 74/467; 475/159

(58) Field of Classification Search ............... 184/1.5, 184/6, 8, 11.1, 11.2, 11.3; 74/467; 475/159
See application file for complete search history.

(56) References Cited

U.S. PATENT DOCUMENTS

| 1,545,048 | A | * | 7/1925  | Flynn ........................ 184/105.1 |
| 2,328,104 | A | * | 8/1943  | Simpson ........................ 74/333 |
| 2,403,579 | A | * | 7/1946  | Carpenter ..................... 184/6.12 |
| 3,220,185 | A | * | 11/1965 | Christenson et al. ........... 60/360 |
| 3,566,999 | A | * | 3/1971  | Robinson ..................... 192/3.28 |
| 3,642,097 | A | * | 2/1972  | Koivunen .......................... 184/6 |
| 3,650,353 | A | * | 3/1972  | Abbott ........................ 184/6.12 |
| 4,226,200 | A | * | 10/1980 | Morisawa et al. .......... 74/606 R |

(Continued)

FOREIGN PATENT DOCUMENTS
JP         62-274161 A        11/1987
(Continued)

OTHER PUBLICATIONS

Extended European Search Report dated Nov. 5, 2009; Application No. 09008212.4-1254.

*Primary Examiner* — Michael Mansen
*Assistant Examiner* — Minh Truong
(74) *Attorney, Agent, or Firm* — Studebaker & Brackett PC; Donald R. Studebaker (57) ABSTRACT An automatic transmission comprises a converter case storing a torque converter, a transmission case storing a transmission mechanism, the transmission case connecting to the converter case at a front thereof and having a rear wall portion to close an end at a rear thereof, a lubricating-oil introduction passage provided at the converter case to introduce lubricating oil, a rear-side lubricating-oil supply passage provided at the rear wall portion to supply the lubricating oil to the transmission mechanism, a lubricating-oil supply pipe extending toward the rear wall portion in the transmission case, an upstream end of which connects to the lubricating-oil introduction passage and a downstream end of which connects to the rear-side lubricating-oil supply passage, wherein the lubricating-oil supply pipe is supported between the converter case and the rear wall portion.

16 Claims, 8 Drawing Sheets

U.S. PATENT DOCUMENTS

| | | | |
|---|---|---|---|
| 4,400,989 A * | 8/1983 | Ikemoto et al. | 74/467 |
| 4,621,710 A * | 11/1986 | Tsukamoto et al. | 184/6.27 |
| 5,152,190 A * | 10/1992 | Jurgens et al. | 74/606 R |
| 5,199,317 A * | 4/1993 | Moore et al. | 74/361 |
| 5,644,954 A * | 7/1997 | Matsufuji | 74/606 R |
| 7,022,039 B2 * | 4/2006 | Hasegawa et al. | 475/159 |
| 7,523,686 B2 * | 4/2009 | Hwang et al. | 74/606 R |
| 2007/0131053 A1 | 6/2007 | Hwang et al. | |

FOREIGN PATENT DOCUMENTS

| | | |
|---|---|---|
| JP | 04-140550 A | 5/1992 |
| JP | 04-194445 A | 7/1992 |

* cited by examiner

|  | 1st clutch (50) | 2nd clutch (52) | 1st brake (54) | 2nd brake (56) | 3rd brake (58) |
|---|---|---|---|---|---|
| 1st gear | O |  | (O) |  |  |
| 2nd gear | O |  |  | O |  |
| 3rd gear | O |  |  |  | O |
| 4th gear | O | O |  |  |  |
| 5th gear |  | O |  |  | O |
| 6th gear |  | O |  | O |  |
| R. gear |  |  | O |  | O |

AUTOMATIC TRANSMISSION

BACKGROUND OF THE INVENTION

The present invention relates to an automatic transmission which may be installed to automotive vehicles.

Conventionally, according to an automatic transmission equipped with a torque converter and a transmission mechanism, oil which is sucked by an oil pump from an oil pan disposed at a lower portion of the transmission mechanism, as operational oil, is supplied to frictional elements and the torque converter which constitute the transmission mechanism via a control valve unit. Further, the operational oil discharged from the torque converter is cooled or heated at a heat exchanger and then supplied to various portions of the transmission mechanism as lubricating oil for bearings and frictional plates of the transmission mechanism.

Herein, the lubricating oil discharged from the torque converter is supplied not only from a torque-converter side (hereinafter, referred to as "front side"), but also from an anti-torque-converter side (hereinafter, referred to as "rear side") in the transmission mechanism. Thus, the lubricating oil can be sufficiently supplied to an whole part of the transmission mechanism.

Moreover, in order to supply the lubricating oil to the rear side, a lubricating oil passage which extends toward the rear side from the front side is formed in a wall of a transmission case which stores the transmission mechanism, like an automatic transmission disclosed in U.S. Patent Application Publication No. 2007/0131053 A1, for example.

That is, according to the automatic transmission disclosed in the above-described publication, the lubricating oil passage has an introduction port of the lubricating oil discharged from the torque converter which is formed at a wall portion of the transmission case on the front side. Further, this lubricating oil passage extends, in a peripheral wall portion, toward a wall portion of the transmission case on the rear side from the above-described introduction port, and further extends, in the wall portion on the rear side, from a connection portion to the peripheral wall portion toward a center portion of the wall portion on the rear side. A support portion to support a power transmission shaft which is disposed at a center portion of the transmission mechanism is formed at the center portion of the wall portion on the rear side, and the above-described oil passage connects to an oil passage formed in the power transmission shaft via the above-described support portion. This oil passage in the power transmission shaft has plural holes to supply the lubricating oil to the transmission mechanism which is disposed at the periphery of the power transmission shaft. Thus, the lubricating oil discharged from the torque converter flows into the passage in the power transmission shaft via the passage passing through the wall portion on the front side, the peripheral wall portion, the wall portion on the rear side, and the support portion of the power transmission shaft of the transmission case, and then is supplied to the transmission mechanism from the rear side via the plural holds.

The oil passage to supply the lubricating oil discharged from the torque converter disposed on the front side to the rear side may be formed inside the power transmission shaft at the central portion of the transmission mechanism instead of the above-described structure. Herein, in case another passage to supply the control pressure of the frictional elements of the automatic transmission is formed inside the power transmission shaft, or in case the power transmission shaft is comprised of a front shaft and a rear shaft which are spilt from each other, a single oil passage which extends from the front side to the rear side may not be formed. Accordingly, it may be necessary to form the oil passage by using the transmission case like the automatic transmission disclosed in the above-described automatic transmission.

However, in order to form the oil passage extending a front-side end portion to a rear-side end portion in the wall of the transmission case, lots of processing using tools, such as a long and thin drill, may be required. Therefore, the processing costs of the oil passage, thus the manufacturing costs of the automatic transmission would increase.

SUMMARY OF THE INVENTION

Accordingly, an object of the present invention is to provide an automatic transmission which can form the oil passage which introduces the lubricating oil introduced from the front side of the transmission case to the rear side and supplies this lubricating oil to the transmission mechanism from the rear side of the transmission case at properly low costs.

According to the present invention, there is provided an automatic transmission comprising, a converter case storing a torque converter, a transmission case storing a transmission mechanism, the transmission case connecting to the converter case at a front thereof and having a rear wall portion to close an end at a rear thereof, a lubricating-oil introduction passage provided at the converter case to introduce lubricating oil, a rear-side lubricating-oil supply passage provided at the rear wall portion to supply the lubricating oil to the transmission mechanism, a lubricating-oil supply pipe extending toward the rear wall portion in the transmission case, an upstream end of which connects to the lubricating-oil introduction passage and a downstream end of which connects to the rear-side lubricating-oil supply passage, wherein the lubricating-oil supply pipe is supported between the converter case and the rear wall portion.

According to the present invention, since the above-described lubricating-oil supply pipe is provided, no oil passage to be formed additionally in the wall of the transmission case may be necessary. Further, since the lubricating-oil supply pipe is supported between the converter case and the rear wall portion, there may be no need to provide any particular members to support the lubricating-oil supply pipe additionally. As a result, the forming costs of the oil passage extending from the front side to the rear side can be kept properly low, so that the increase of the manufacturing costs of the automatic transmission can be suppressed.

According to an embodiment of the present invention, a power transmission shaft is provided at a central portion of the transmission mechanism, a rear end portion of which is supported at the rear wall portion, and the rear-side lubricating-oil supply passage is provided so as to connect to a shaft inner passage which is formed inside the power transmission shaft to supply the lubricating oil to the transmission mechanism via a support portion of the rear wall portion. Thereby, the lubricating oil can be supplied to the transmission mechanism from the central portion.

According to another embodiment of the present invention, the lubricating-oil supply pipe is supported in such a manner that the upstream end thereof is inserted into a support hole which is formed at a front wall portion of the transmission case so as to penetrate the front wall portion, the lubricating-oil supply pipe has a branch hole formed at a supported portion thereof which is supported at the support hole, and a front-side lubricating-oil supply passage which has an inlet port facing to the branch hole and supplies the lubricating oil of the lubricating-oil supply pipe to the transmission mechanism is formed inside the front wall portion. Thereby, the lubricating oil can be supplied to the transmission mechanism from the front side.

According to another embodiment of the present invention, the lubricating-oil supply pipe is supported in such a manner that the upstream end thereof is inserted into a support hole which is formed at a middle wall portion of the transmission case so as to penetrate the middle wall portion, the lubricating-oil supply pipe has a branch hole formed at a supported portion thereof which is supported at the support hole, and a middle-portion lubricating-oil supply passage which has an inlet port facing to the branch hole and supplies the lubricating oil of the lubricating-oil supply pipe to the transmission mechanism is formed inside the middle wall portion. Thereby, the lubricating oil can be supplied to the transmission mechanism from the middle portion in the axis direction.

According to another embodiment of the present invention, the transmission case is configured such that a diameter of a front side thereof is greater than that of a rear side thereof, and the lubricating-oil supply pipe is disposed in a curve shape along an inner face of the transmission case. Thereby, a large enough space to dispose the elements of the transmission mechanism can be ensured inside the transmission case.

According to another embodiment of the present invention, the transmission case has an opening at a peripheral face thereof which is near a disposition position of the lubricating-oil supply pipe. Thereby, the lubricating-oil pipe can be easily attached by putting a worker's hand into the opening.

According to another embodiment of the present invention, a heat exchanger to conduct a heat exchange between the lubricating oil and another medium is attached to the converter case, and a lubricating-oil outlet of the heat exchanger connects to an upstream portion of the lubricating-oil introduction passage of the converter case. Thereby, no additional member to interconnect the lubricating-oil introduction passage and the lubricating-oil outlet of the heat exchanger may be necessary.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
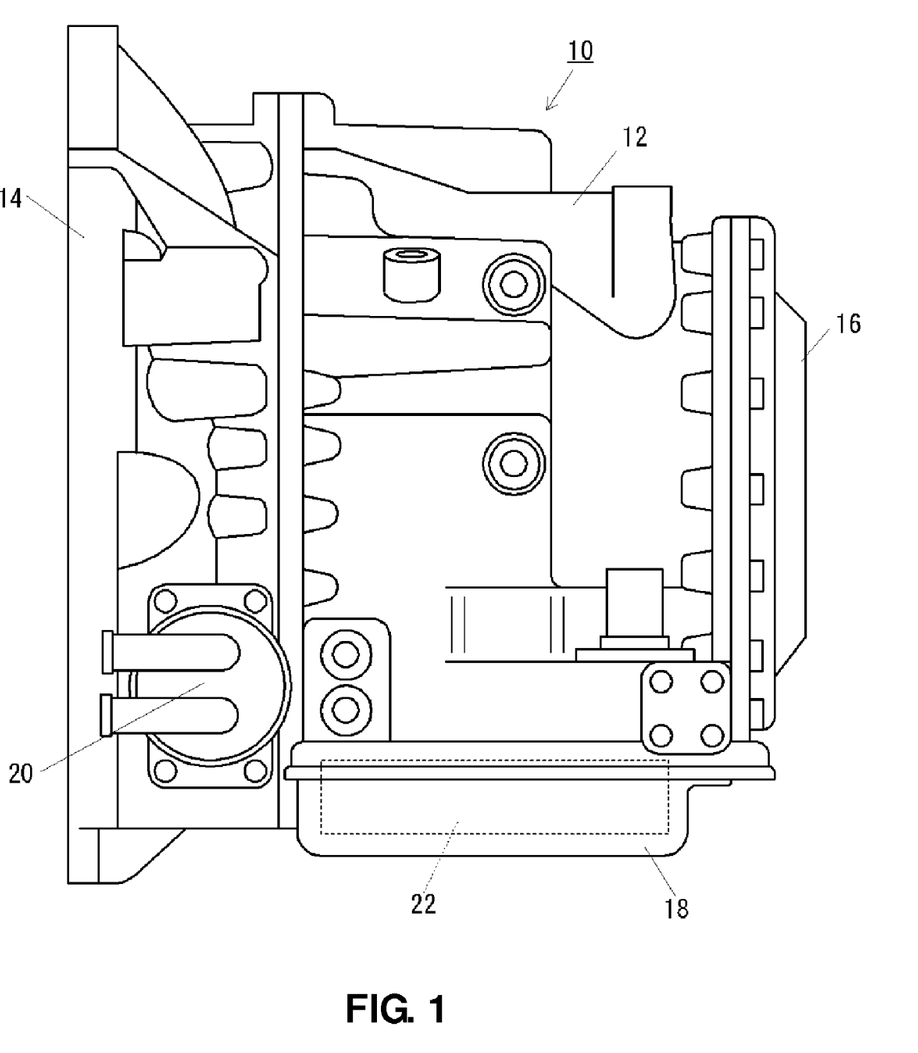
FIG. 1 is an outer view of an automatic transmission according to a first embodiment of the present invention.

FIG. 1 is an outer view of an automatic transmission according to a first embodiment of the present invention. An automatic transmission denoted by reference number 10 comprises a cylindrical transmission case body 12 which stores a transmission mechanism, a converter case 14 which is connected to a front side (left side) of the transmission and stores a torque converter T, a rear cover 16 which closes a rear side (right side) of the transmission case body 12, an oil pan 18 which is attached to a lower portion of the transmission case body 12, a heat exchanger 20 which is attached to a side face of the converter case 14, and a control valve unit 22 which is stored in the oil pan 18.

Figure 2:
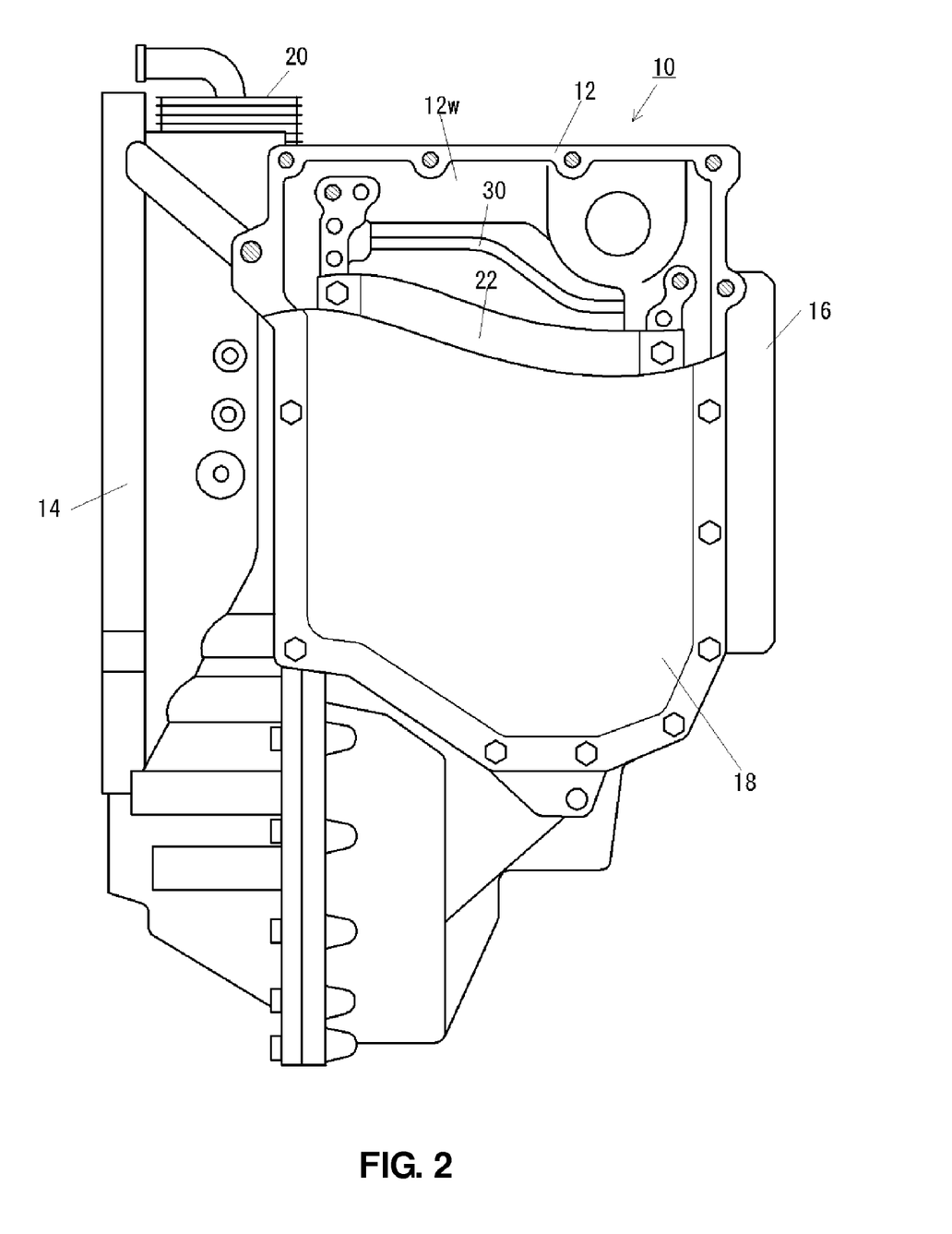
FIG. 2 is a view of the automatic transmission of FIG. 1, when viewed from the side of an oil pan, showing a part of the inside of the oil pan.

As shown in FIG. 2 which shows the automatic transmission when viewed from the side of the oil pan 18, a lubricating-oil supply pipe 30, which is one of the features of the present invention, is disposed at a specified position which can be seen from the outside through an opening 12w which is formed at a peripheral face of the transmission case body 12 so as to be closed by the oil pan 18. In other words, the transmission case 12 has the opening 12w at the peripheral face which is near a disposition position of the lubricating-oil supply pipe 30.

Figure 3:
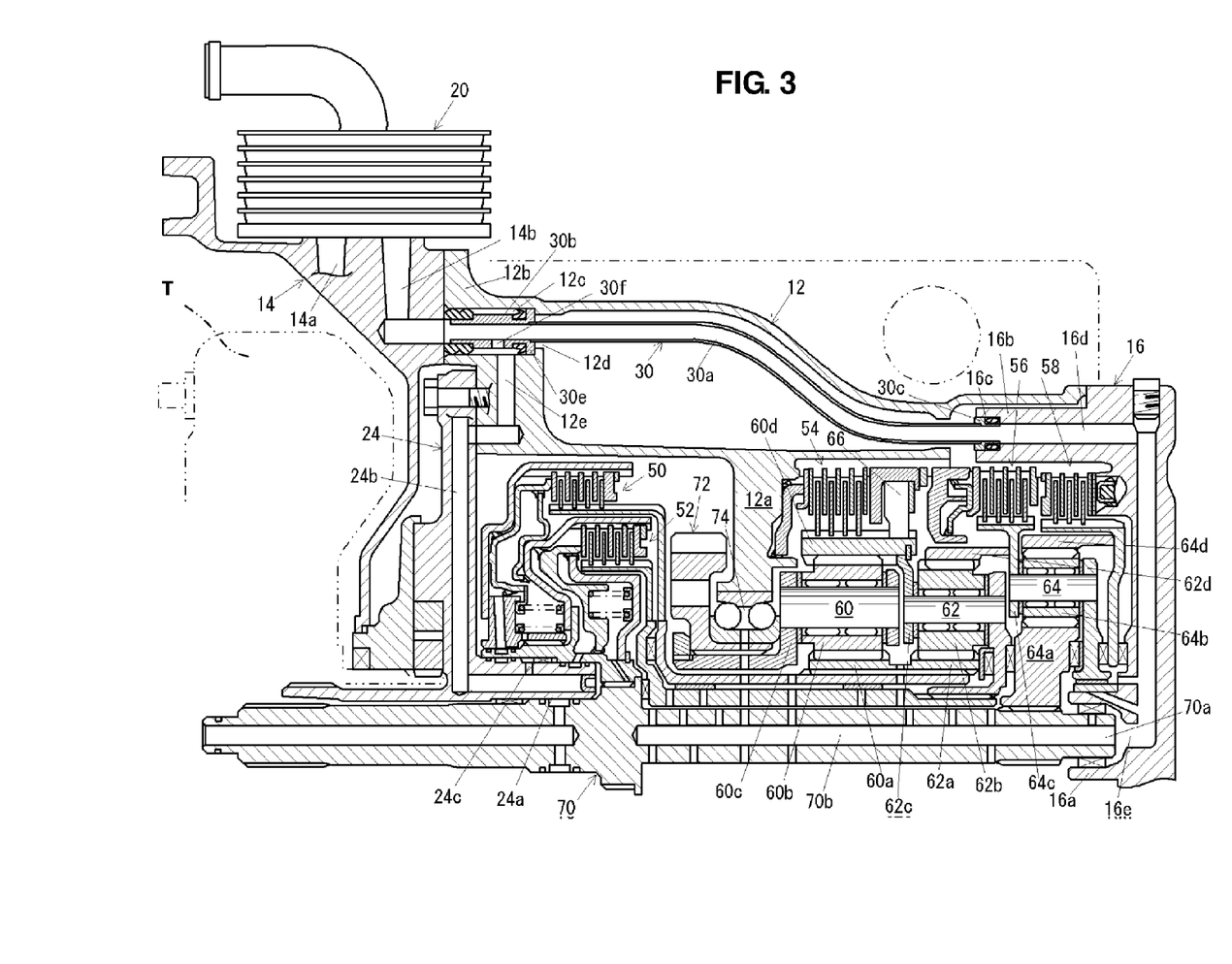
FIG. 3 is a sectional view of surroundings of a lubricating-oil supply pipe, when viewed in a direction which is the same as that shown in FIG. 2.

FIG. 3 is a sectional view of surroundings of the lubricating-oil supply pipe 30, when viewed in a direction which is the same as that shown in FIG. 2.

As shown in FIG. 3, a case of the transmission mechanism is formed by the cylindrical transmission case body 12, the rear cover 16 which closes the rear side of the transmission case body 12, and a front cover 24, not seen from the outside, which is disposed in a space between the converter case 14 and the case body 12 so as to close the front side of the transmission case body 12.

As elements of the transmission mechanism stored in the transmission case, a first clutch 50 and a second clutch 52 are disposed on the side of the front cover 24, and a first brake 54, a second brake 56, a third brake 58, a first planetary gear set 60, a second planetary gear set 62, and a third planetary gear set 64 are disposed on the side of the rear cover 16 from a middle wall portion 12a which is formed at a middle portion of the transmission case body 12 in an axial direction. An input shaft 70 as a power transmission shaft of the automatic transmission 10 is disposed at a central portion. The input shaft 70 is supported in such a manner that its rear end on the side of the rear cover 16 is inserted into a boss portion 16a which is formed at the center of the rear cover 16. The input shaft 70 is further supported in such a manner that a portion near its front end on the side of the front cover 24 is inserted into a boss portion 24a which is formed at the center of the front cover 24. Moreover, an output gear 72 of the automatic transmission 10 is supported at the middle wall portion 12a via a bearing 74.

The first clutch 50, second clutch 52, first brake 54, second brake 56, and third clutch 58 are multi-plate type of frictional elements with plural frictional plates.

The first planetary gear set 60, second planetary gear set 62, and third planetary gear set 64, which are a single pinion type of planetary gear set, comprise sun gears 60a, 62a, 64a, pinions 60b, 62b, 64b which engage with these sun gears respectively, carriers 60c, 62c, 64c which support these sun gears respectively, and ring gears 60d, 62d, 64d which engage with these pinion gears respectively.

The input shaft 70 is connected to the sun gear 64a of the third planetary gear set 64. The sun gear 60a of the first planetary gear set 60 is connected to the sun gear 62a of the second planetary gear set 62. The ring gear 60d of the first planetary gear set 60 is connected to the carrier 62c of the second planetary gear set 62. The ring gear 62 of the second planetary gear set 62 is connected to the carrier 64c of the third planetary gear set 64. The output gear 72 is connected to the carrier 60c of the first planetary gear set 60.

The sun gear 60a of the first planetary gear set 60 and the sun gear 62a of the second planetary gear set 62 are connected to the input shaft 70 via the first clutch 50. The carrier 62c3 of the second planetary gear set 62 is connected to the input shaft 70 via the second clutch 52.

Further, the ring gear 60d of the first planetary gear set 60 and the carrier 62c of the second planetary gear set 62 are connected to the transmission case body 12 via the first brake 54 and a one-way clutch 66. The ring gear 62d of the second planetary gear set 62 and the carrier 64c of the third planetary gear set 64 are connected to the transmission case body 12 via the second brake 56. Further, the ring gear 64d of the third planetary gear set 64 is connected to the transmission case body 12 via the third brake 58.

Figure 4:
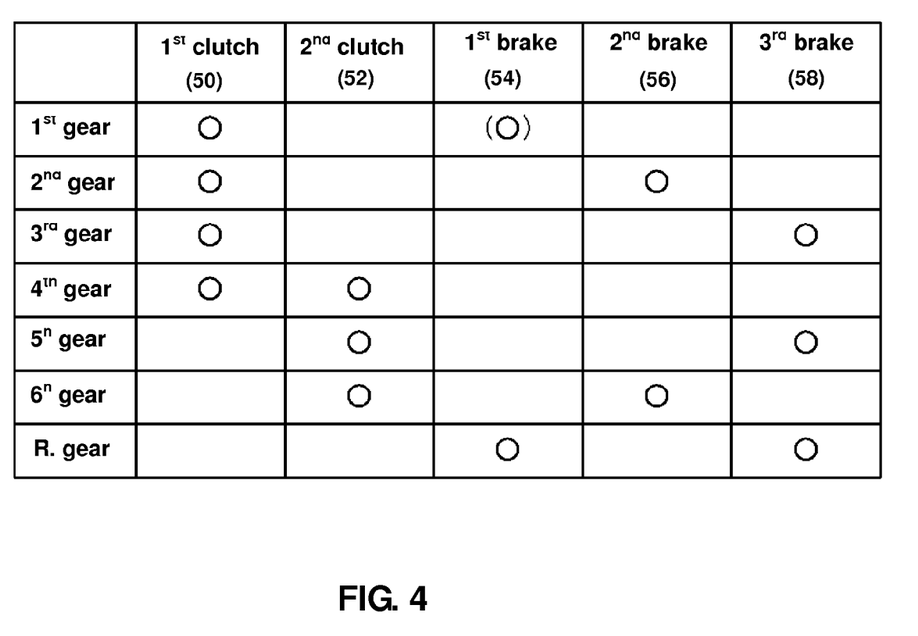
FIG. 4 is a connection table to determine gears of the automatic transmission to be selected.

The automatic transmission 10 achieves shifts for the six-forward gears and the reverse gear with connection combinations of the first and second clutches 50, 52 and the first, second and third brakes 54, 56, 58. The relationships between connection combinations of these frictional elements and selected gears are shown in the table of FIG. 4.

That is, the first clutch 50 and the first brake 54 are connected to each other in the first gear, where the rotation of the input shaft 70 is inputted to the sun gear 60a of the first planetary gear set 60 with a great speed reduction by the gear set 60, and then outputted from the carrier 60c of the gear set 60 to the output gear 72. Herein, the first brake 54 is connected only in the first gear state where the engine brake works. In the first gear state where the engine brake does not work, the one-way clutch 66 is locked up for accomplishing the first gear.

In the second gear, the first clutch 50 and the second brake 56 are connected to each other, where the rotation of the input shaft 70 is inputted to the sun gear 60a of the first planetary gear set 60 and at the same time inputted to the ring gear 60d of the first planetary gear set 60 via the second planetary gear set 62 with a smaller ratio of speed reduction than the first gear, and then outputted from the carrier 60c of the first planetary gear set 60 to the output gear 72.

In the third gear, the first clutch 50 and the third brake 58 are connected to each other, where the rotation of the input shaft 70 is inputted to the sun gear 60a of the first planetary gear set 60 and at the same time inputted to the ring gear 60d of the first planetary gear set 60 via the third planetary gear set 64 and the second planetary gear set 62 with a smaller ratio of speed reduction than the second gear, and then outputted from the carrier 60c of the first planetary ear set 60 to the output gear 72.

In the fourth gear, the first clutch 50 and the second clutch 52 are connected to each other, where the rotation of the input shaft 70 is inputted to the sun gear 60a of the first planetary gear set 60 and at the same time inputted to the ring gear 60d of the first planetary gear set 60 via the second planetary gear set 62 directly. Thereby, the whole first planetary gear set 60 rotates along with the input shaft 70, so that the rotation of the input shaft 70 is outputted from the carrier 60c to the output gear 72 with the speed reduction ratio of 1.

In the fifth gear, the second clutch 52 and the third brake 58 are connected to each other, where the rotation of the input shaft 70 is inputted to the ring gear 60d of the first planetary gear set 60 via the second planetary gear set 62 directly and at the same time inputted to the sun gear 60a of the first planetary gear set 60 via the third planetary gear set 64 and the second planetary gear set 62. Thereby, the rotation of the input shaft 70 is outputted from the carrier 60c of the first planetary gear set 60 to the output gear 72 with the speed increase.

In the sixth gear, the second clutch 52 and the second brake 56 are connected to each other, where the rotation of the input shaft 70 is inputted to the ring gear 60d of the first planetary gear set 60 via the second planetary gear set 62 directly and at the same time inputted to the sun gear 60a of the first planetary gear set 60 via the second planetary gear set 620. Thereby, the rotation of the input shaft 70 is outputted from the carrier 60c of the first planetary gear set 60 to the output gear 7 with a greater speed increase ratio than the fifth gear.

Further, the first brake 54 and the third brake 58 are connected to each other, where the rotation of the input shaft 70 is inputted to the sun gear 60a of the first planetary gear set 60 via the second planetary gear set 62 and the third planetary gear set 64. Herein, the rotational direction is reversed by the second planetary gear set 62, so that the rotation of the input shaft 70 is outputted from the carrier 60c of the first planetary gear set 60 to the output gear 72 with a reverse rotation.

As described above, the automatic transmission 10 achieves shifts for the six-forward gears and the reverse gear with two clutches 50, 52, three brakes 54, 56, 58, three single pinion type of planetary gear sets 60, 62, 64.

Hereinafter, the oil passages of the lubricating oil and the elements of the transmission mechanism to be lubricated will be described referring to flows of the lubricating oil.

The oil which has been cooled by coolant (cooling water, for example) at the heat exchanger 20 is supplied to the elements of the transmission mechanism as the lubricating oil.

As shown in FIG. 3, the heat exchanger 20 is attached to the peripheral portion of the converter case 14 near the transmission case body 12. The oil coming in from an oil passage 14a of the converter case 14, which has been used as the operational oil of the torque converter T, is cooled by the coolant in the heat exchanger 20. Then, the cooled oil is supplied to the transmission case body 12 via another oil passage 14b of the converter case 14 (which corresponds to a "lubricating-oil introduction passage" specified in the claims). An outlet of the oil of the heat exchanger 20 connects to the oil passage 14b directly.

The lubricating oil coming out of the oil passage 14b flows into the lubricating-oil supply pipe 30 disposed inside the transmission case body 12. Specifically, a hole 12c is formed at a peripheral portion of a front wall portion 12b of the transmission case body 12 which faces to an outlet of the oil passage 14b of the converter case 14 so as to penetrate the front wall portion in the axial direction. One end of the lubricating-oil supply pipe 30 is inserted into the hole 12c for supporting.

Figure 5:
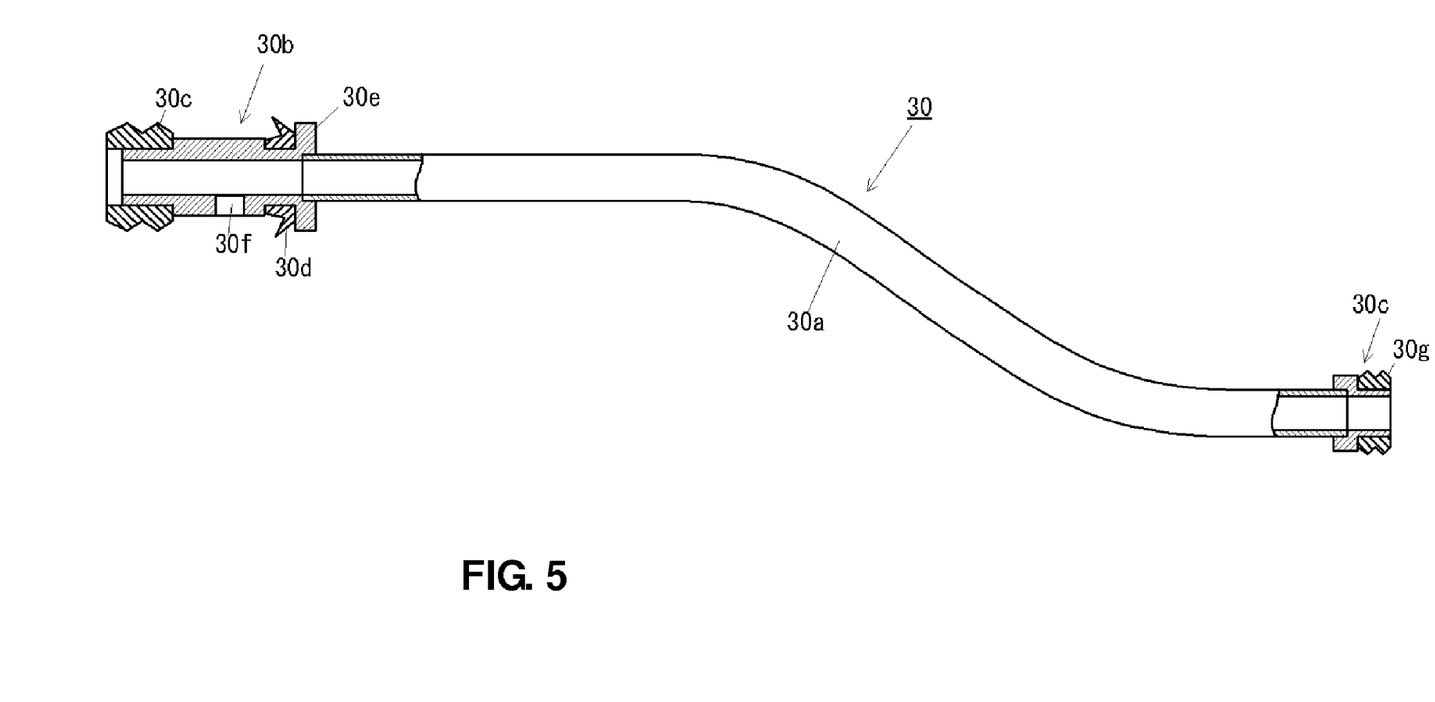
FIG. 5 is a specific view of the lubricating-oil supply pipe.

The lubricating-oil supply pipe 30, as shown in FIGS. 3 and 5, comprises a pipe portion 30a and both-end supported portions 30b, 30c which are inserted into holes for supporting. The lubricating-oil supply pipe 30 is formed in a curve shape so as to extend along an inner face of the transmission case body 12 having a contour in which the diameter of its front side is greater than that of its rear side.

The supported portion 30b of the lubricating-oil supply pipe 30 is made of a substantially cylindrical member, and its one end is coupled to the one end of the pipe portion 30a by welding or the like. The supported portion 30b is inserted into the hole 12c formed at the front wall portion 12b of the transmission case body 12. Seal members 30c, 30d to seal a gap with the hole 12c are attached to the side of the pipe portion 30a and the opposite side to the pipe portion 30a respectively. Further, a stopper portion 30e is formed at the supported portion 30b on the side of the pipe portion 30a. The stopper portion 30e prevents the lubricating-oil supply pipe 30 from moving out of the hole 12c, by contacting a small-diameter portion 12d of the hole 12c formed at the front wall portion 12b of the transmission case body 12. This small-diameter portion 12d has an inner diameter to allow the pipe portion 30a and the supported portion 30c of the pipe 30 to go through. Further, a branch hole 30f which interconnects the inside and the outside therethrough, that is, the flow of the lubricating oil braches from the pipe portion 30a therethrough, is formed between the seal members 30c, 30d of the supported portion 30b. The branch hole 30f will be described in detail later.

The supported portion 30c of the lubricating-oil supply pipe 30 is made of a substantially cylindrical member as well, and its one end is coupled to the other end of the pipe portion 30a by means of welding or the like. The supported portion 30c is inserted into a hole 16c which is formed at a tip of a cylindrical portion 16b of the outer periphery of the rear cover 16. A seal member 30g to seal a gap with the hole 16c is attached.

Returning to FIG. 3, part of the lubricating oil coming into the supported portion 30b of the lubricating-oil supply pipe 30 from the heat exchanger 20 flows into an oil passage 12e (which corresponds to a "front-side lubricating-oil supply passage" defined in the claims) which is formed at the front wall portion 12b of the transmission case body 12 via through the branch hole 30f. The rest of the lubricating oil follows into the pipe portion 30a.

Figure 6:
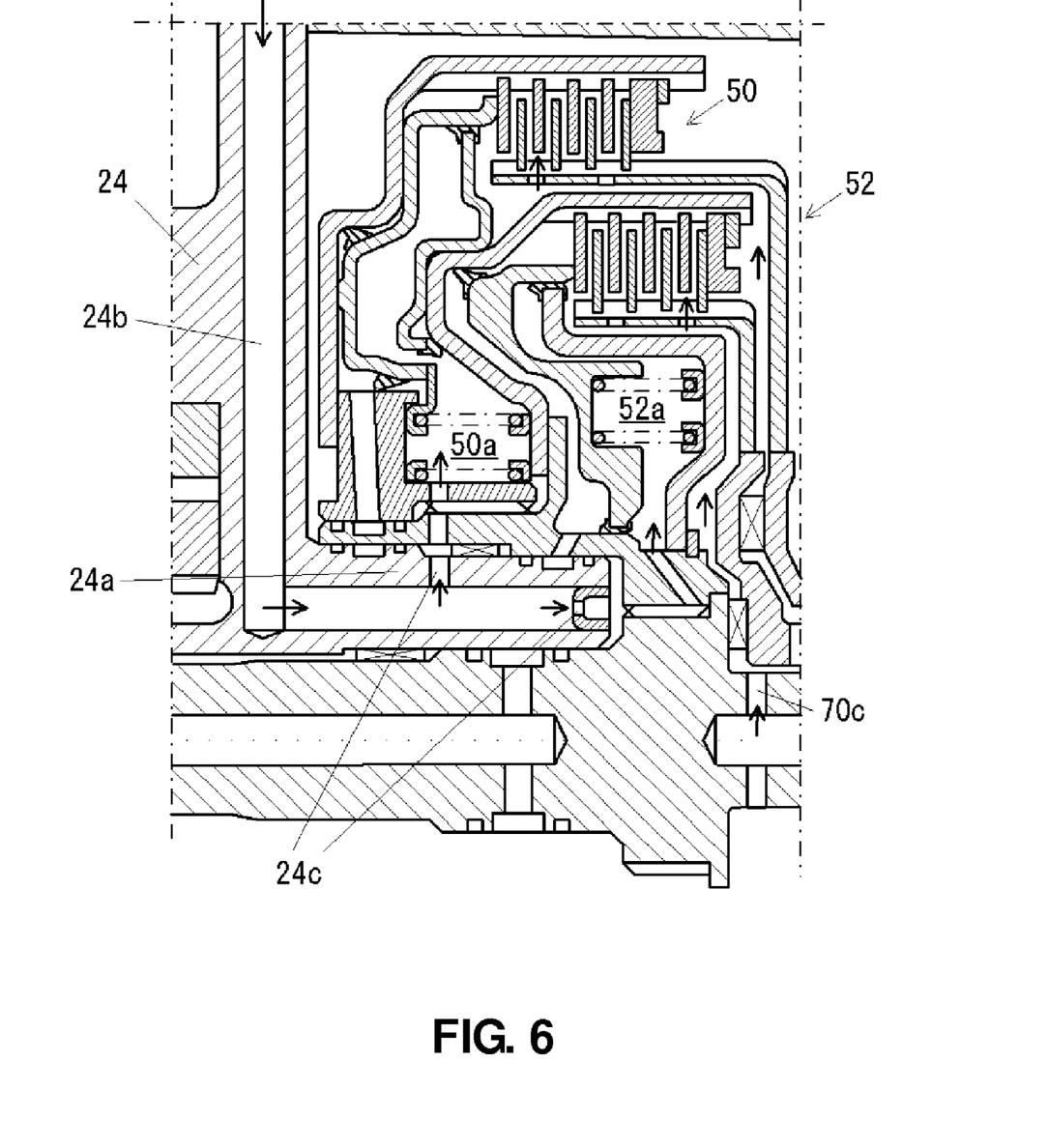
FIG. 6 is an enlarged partial view of FIG. 3.

The oil passage 12e formed at the front wall portion 12b connects to an oil passage 24b (which corresponds to a "front-side lubricating-oil supply passage" specified in the claims) which is formed at the front cover 24. As shown in FIG. 6 which is an enlarged view of FIG. 3, the oil passage 24b extends in the front cover 24 toward the central portion, and then to the tip portion of the boss portion 24a, where plural holes 24c to supply the lubricating oil to the elements of the transmission mechanism disposed around the boss portion 24a are provided. Thus, as shown by an arrow, the lubricating oil coming down in the oil passage 24b flows out of the plural holes 24c and then is supplied to a centrifugal balance chamber 50a of the first clutch 50, a centrifugal balance chamber 50b of the second clutch 52, and respective bearings of the rotational elements of the first clutch 50 and the second clutch 52.

Figure 7:
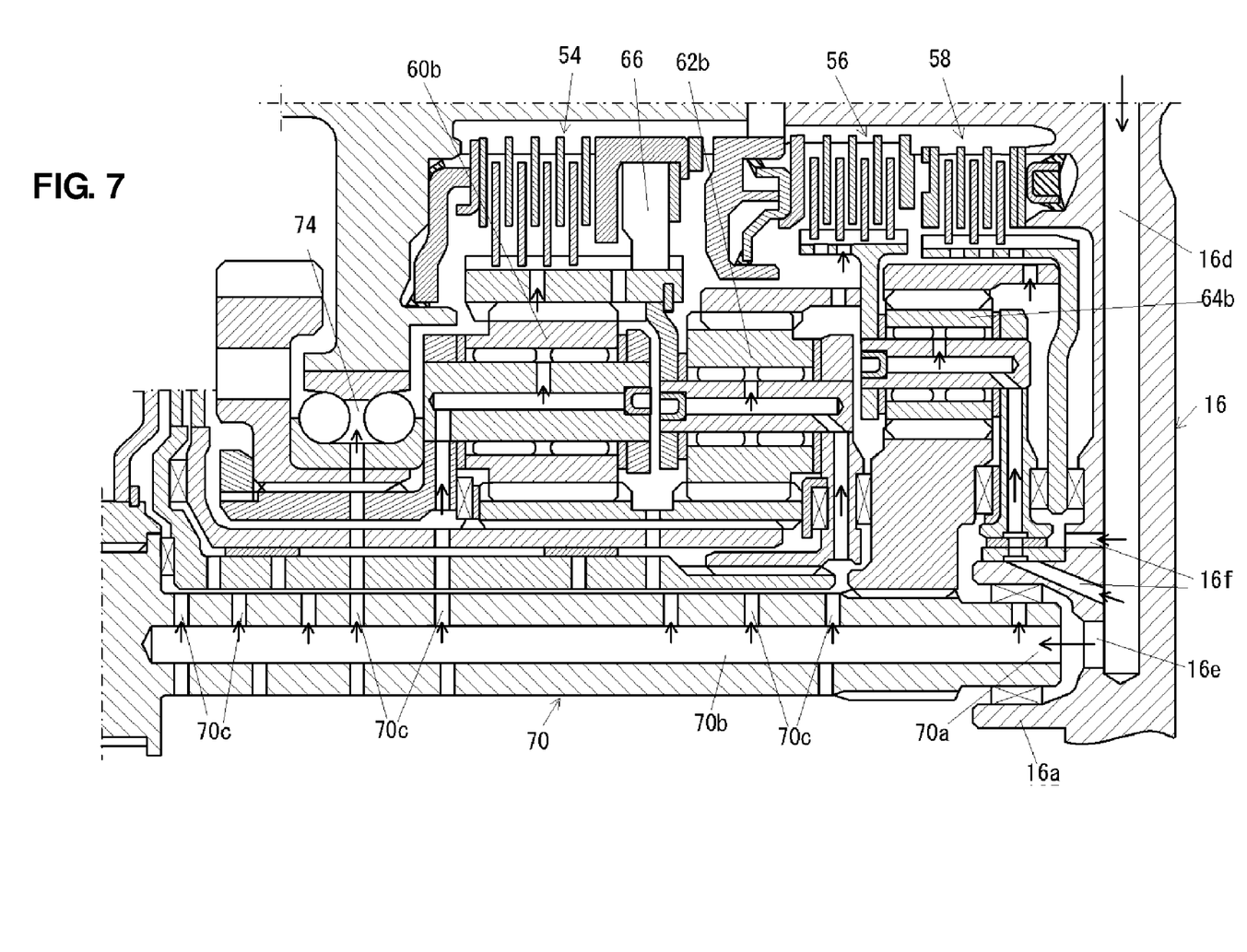
FIG. 7 is another enlarged partial view of FIG. 3.

Meanwhile, returning to FIG. 3, the lubricating oil coming down into the pipe portion 30a of the lubricating-oil supply pipe 30 flows into an oil passage 16d (which corresponds to a "rear-side lubricating-oil supply passage" specified in the claims) which connects to the hole 16c into which the supported portion 30c of the pipe 30 is inserted. This oil passage 16d extends in the rear cover 16 toward the central portion, and, as shown in FIG. 7 which is an enlarged view of FIG. 3, it has an outlet 16e inside the boss portion 16a and plural outlets 16f at a portion near the boss portion 16a.

An oil passage 70b which has an inlet 70a which faces the outlet 16e at the boss portion 16a is formed inside the input shaft 70 so as to extend in the axis direction of the input shaft 70. This oil passage 70b extends to a central portion of the input shaft 70 as shown in FIG. 3. At a peripheral portion of the input shaft 70 are provided plural holes 70c to supply the lubricating oil to the elements of the transmission mechanism.

Thus, as shown by an arrow, the lubricating oil coming down in the oil passage 16d flows out of the hole 16e and is supplied into the oil passage 70b inside the input shaft 70a and to the third brake 58 and bearings of the piston 64b of the third planetary gear set and the like via the outlets 16f. The lubricating oil flowing into the oil passage 70b inside the input shaft 70 is supplied to the first clutch 50, second clutch 52 (see FIG. 6), first brake 54, second brake 56, bearings of the pistons 60b, 62b of the first and second planetary gear sets, one-way clutch 66, bearing 74 and the like via the plural holes 70c.

Hereinafter, an attaching method of the lubricating-oil supply pipe 30 will be described referring to FIG. 3. This lubricating-oil supply pipe 30 may be attached before assembling the oil pan 18 and the converter case 14 to the transmission case body 12.

At first, the supported portion 30c of the lubricating-oil supply pipe 30 is inserted into the hole 12 formed at the front wall portion 12b of the transmission case body 12 from the front side. Then, as shown in FIG. 2, the supported portion 30c is inserted into the hole 16c of the rear cover 16, recognizing the lubricating-oil supply pipe 30 via the opening 12w of the transmission case body 12. After this insertion, the converter case 14 is coupled to the transmission case body 12, so the lubricating-oil supply pipe 30 is pushed until the stopper portion 30e of the supported portion 30b is prevented from further moving by the small-diameter portion 12d of the hole 12c. Thus, the lubricating-oil supply pipe 30 is supported between the converter case 14 and the rear wall portion 16 at both ends which are inserted into the holes 12c, 16c.

According to the present embodiment, since the lubricating-oil supply pipe 30 is provided, no oil passage to be formed additionally in the wall of the transmission case body 12 may be necessary. Further, since the lubricating-oil supply pipe 30 is supported between the converter case 14 and the rear cover 16 of the transmission case, there may be no need to provide any particular members to support the lubricating-oil supply pipe 30 additionally. As a result, the forming costs of the oil passage extending from the front side to the rear side can be kept properly low, so that increase of the manufacturing costs of the automatic transmission 10 can be suppressed.

Further, as shown in FIG. 3, the rear end portion of the input shaft 70 provided at the central portion of the transmission mechanism is supported at the rear cover 16, and the oil passage 16d of the lubricating oil at the rear cover connects via the boss portion 16a of the rear cover 16 to the oil passage 70 which is formed inside the input shaft 70 to supply the lubricating oil to the transmission mechanism through the plural holes 70c. Thereby, the lubricating oil can be supplied to the transmission mechanism from the central portion.

The lubricating-oil supply pipe 30, as shown in FIG. 3, is supported in such a manner that the upstream end is inserted into the hole 12c which is formed at the front wall portion 12b of the transmission case body 12 so as to penetrate the front wall portion 12b. The lubricating-oil supply pipe 30 has the branch hole 30f which is formed at the supported portion 30b which is supported at the hole 12c. The oil passages 12e, 24b which has the inlet ports facing to the branch hole 30f and supply the lubricating oil of the lubricating-oil supply pipe 30 to the transmission mechanism are formed inside the front wall portion 12b and the front cover 24. Thereby, the lubricating oil can be supplied to the transmission mechanism from the front side.

The transmission case body 12, as shown in FIG. 3, is configured such that the front side's diameter is greater than the rear side's diameter, and the lubricating-oil supply pipe 30 is disposed in the curve shape along the inner face of the transmission case body 12. Thereby, a large enough space to dispose the elements of the transmission mechanism can be ensured inside the transmission case body 12.

Moreover, the transmission case body 12, as shown in FIG. 2, has the opening 12w at the peripheral face which is near the disposition position of the lubricating-oil supply pipe 30. Thereby, the lubricating-oil pipe 30 can be easily attached by putting a worker's hand into the opening 12w.

The heat exchanger 20 to conduct the heat exchange between the lubricating oil and another medium is attached to the converter case 14, and the lubricating-oil outlet of the heat exchanger 20 connects to the upstream portion of the passage 14b of the converter case 14. Thereby, no additional member to interconnect the passage 14b and the lubricating-oil outlet of the heat exchanger 20 may be necessary.

Embodiment 2

Figure 8:
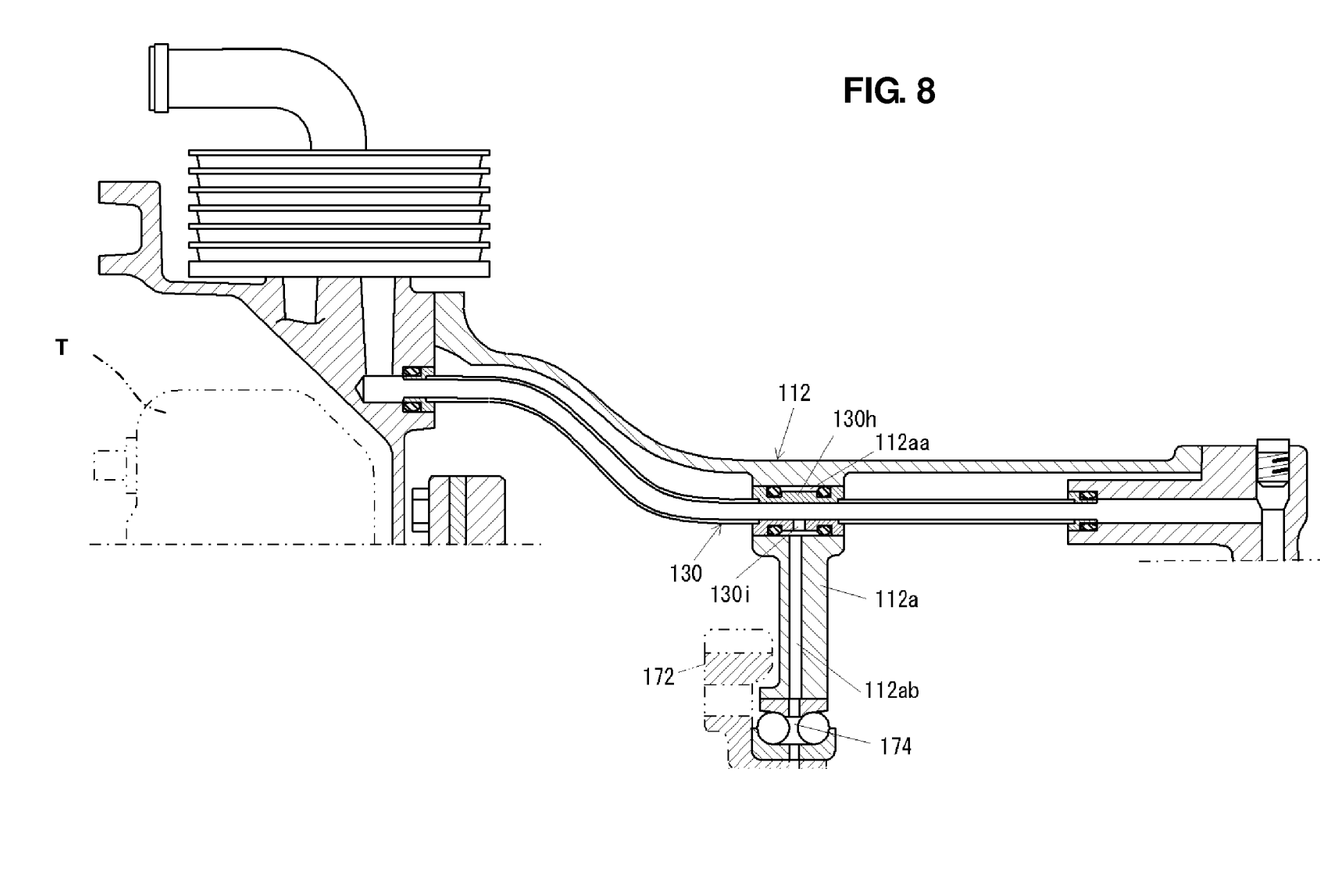
FIG. 8 is a view showing a lubricating-oil supply pipe and a part of a body of a transmission case according to a second embodiment.

In the first embodiment described above, the lubricating oil supplied to the bearing 74 supporting the output gear 72 is provided via the oil passage 16d of the rear cover 16 and the oil passage 70b of the input shaft 70 as shown in FIG. 3. However, a different structure may be applied in this regard like a second embodiment shown in FIG. 8. That is, according to the second embodiment, a transmission case body 112 is configured such that a middle wall portion 112a is provided so as to extend from a central portion to a peripheral wall portion of the case body 112. A hole 112aa is formed at the middle wall portion 112a so as to penetrate the middle wall portion 112a. A lubricating-oil supply pipe 130 is inserted into this hole 112aa and supported thereby. A branch hole 130i is formed at a supported portion 130h of the lubricating-oil supply pipe 130 which is supported at the hole 112aa. An oil passage 112ab to connect the branch hole 130i and a bearing 174 to support an output gear 172 is formed inside the middle wall portion 112a. Thereby, the lubricating oil can be supplied to the transmission mechanism from the middle portion in the axis direction.

The present invention should not be limited to the above-described embodiments, and any other modifications and improvements may be applied within the scope of a spirit of the present invention.

For example, while the transmission case storing the transmission mechanism is comprised of the cylindrical transmission case 12, the rear cover 16 closing the rear side, and the front cover 24 closing the front side in the above-described embodiment, the present invention is not limited to this structure. The rear cover 16 and the transmission case body 12 may be formed integrally by a single member in such a manner that the front cover 24 closes a front opening of this case member. In this case, the rear cover 16 forms a rear wall portion of the case member. To the contrary, the front cover 24 and the transmission case body 12 may be formed integrally by a single member in such a manner that the rear cover 16 closes a rear opening of this case member. In this case, the front cover 24 forms a front wall portion of the case member.

Moreover, while the lubricating oil is supplied to the transmission mechanism from both the rear side and the front side in the above-described embodiment, it may be supplied to the transmission mechanism only from the rear side. In this case, for example, the oil passage formed inside the input shaft may be provided so as to extend from the rear end of the input shaft to the front end of the input shaft, and plural holes to supply the lubricating oil to the elements around the shaft may be formed at the front portion of the oil passage.

Further, while the lubricating oil to be supplied to a part of the elements of the transmission mechanism is provided via the oil passage inside the input shaft in the above-described embodiment, the present invention is not limited to this structure. For example, the lubricating oil may be supplied to the transmission mechanism from the front side and the rear side.

While the lubricating oil to be supplied to the transmission mechanism is the one which has flowed through the heat exchanger in the above-described embodiment, it may be supplied to the transmission mechanism directly without flowing through the heat exchanger

What is claimed is:

1. An automatic transmission, comprising:
    a converter case storing a torque converter;
    a transmission case storing a transmission mechanism, the transmission case connecting to the converter case at a front thereof and having a rear wall portion to close an end at a rear thereof;
    a lubricating-oil introduction passage provided at the converter case to introduce lubricating oil;
    a rear-side lubricating-oil supply passage provided at the rear wall portion to supply the lubricating oil to the transmission mechanism;
    a lubricating-oil supply pipe positioned in a space which is enclosed by the converter case and the transmission case and extending from the converter case to the rear wall portion of the transmission case, an upstream end of which connects to the lubricating-oil introduction passage provided at the converter case and a downstream end of which connects to the rear-side lubricating-oil supply passage provided at the rear wall portion of the transmission case,
    wherein both end portions of said lubricating-oil supply pipe are inserted into and supported by support holes formed respectively at a front wall portion and the rear wall portion of the transmission case, and said lubricating-oil supply pipe is sandwiched between the converter case and the transmission case and directly supplies the lubricating oil which is introduced into the lubricating-oil introduction passage provided at the converter case to the rear-side lubricating-oil supply passage provided at the rear wall portion of the transmission case therethrough.

2. The automatic transmission of claim 1, wherein a power transmission shaft is provided at a central portion of the transmission mechanism, a rear end portion of which is supported at the rear wall portion, and said rear-side lubricating-oil supply passage is provided so as to connect to a shaft inner passage which is formed inside the power transmission shaft to supply the lubricating oil to the transmission mechanism via a support portion of the rear wall portion.

3. The automatic transmission of claim 2, wherein said lubricating-oil supply pipe is supported in such a manner that the upstream end thereof is inserted into a support hole which is formed at a front wall portion of the transmission case so as to penetrate the front wall portion, the lubricating-oil supply pipe has a branch hole formed at a supported portion thereof which is supported at the support hole, and a front-side lubricating-oil supply passage which has an inlet port facing to said branch hole and supplies the lubricating oil of the lubricating-oil supply pipe to the transmission mechanism is formed inside the front wall portion.

4. The automatic transmission of claim 1, wherein said lubricating-oil supply pipe is supported in such a manner that the upstream end thereof is inserted into the support hole formed at the front wall portion of the transmission case so as to penetrate the front wall portion, the lubricating-oil supply pipe has a branch hole formed at a supported portion thereof which is supported at the support hole, and a front-side lubricating-oil supply passage which has an inlet port facing to said branch hole and supplies the lubricating oil of the lubricating-oil supply pipe to the transmission mechanism is formed inside the front wall portion.

5. The automatic transmission of claim 1, wherein the transmission case is configured such that a diameter of a front side thereof is greater than that of a rear side thereof, and said lubricating-oil supply pipe is disposed in a curve shape along an inner face of the transmission case.

6. The automatic transmission of claim 1, wherein the transmission case has an opening at a peripheral face thereof which is near a disposition position of said lubricating-oil supply pipe.

7. The automatic transmission of claim 1, wherein a heat exchanger to conduct a heat exchange between the lubricating oil and water is attached to the converter case, and a lubricating-oil outlet of the heat exchanger connects to an upstream portion of said lubricating-oil introduction passage of the converter case.

8. The automatic transmission of claim 7, wherein the transmission case is configured such that a diameter of a front side thereof is greater than that of a rear side thereof, and said lubricating-oil supply pipe is disposed in a curve shape along an inner face of the transmission case and connected to said lubricating-oil passage at said front side of the transmission case.

9. The automatic transmission of claim 8, wherein the transmission case has an opening at a peripheral face thereof which is near a disposition position of said lubricating-oil supply pipe.

10. The automatic transmission of claim 1, wherein a heat exchanger to conduct a heat exchange between the lubricating oil and water for oil cooling is attached to the converter case, said converter case includes another oil passage which is formed separately from said lubricating-oil introduction passage to supply the oil used as operational oil of the torque converter to said heat exchanger for the oil cooling, and the oil cooled by the heat exchanger is supplied to the lubricating-oil introduction passage of the converter case, whereby the cooled oil can be supplied from the lubricating-oil introduction passage of the converter case to the rear-side lubricating-oil supply passage provided at the rear wall portion of the transmission case via said lubricating-oil supply pipe.

11. The automatic transmission of claim 1, wherein the transmission case is configured such that a diameter of a front side thereof is greater than that of a rear side thereof, and said lubricating-oil supply pipe is disposed in a curve shape along an inner face of the transmission case and connected to said lubricating-oil passage at said front side of the transmission case.

12. An automatic transmission, comprising:
a converter case storing a torque converter;
a transmission case storing a transmission mechanism, the transmission case connecting to the converter case at a front thereof and having a rear wall portion to close an end at a rear thereof;
a lubricating-oil introduction passage provided at the converter case to introduce lubricating oil;
a rear-side lubricating-oil supply passage provided at the rear wall portion to supply the lubricating oil to the transmission mechanism;
a lubricating-oil supply pipe positioned in a space which is enclosed by the converter case and the transmission case and extending from the converter case to the rear wall portion of the transmission case, an upstream end of which connects to the lubricating-oil introduction passage provided at the converter case and a downstream end of which connects to the rear-side lubricating-oil supply passage provided at the rear wall portion of the transmission case,
wherein said lubricating-oil supply pipe is supported between the converter case and the rear wall portion at both ends which are inserted into and supported by support holes formed respectively at a front wall portion and the rear wall portion of the transmission case and directly supplies the lubricating oil introduced into the lubricating-oil introduction passage provided at the converter case to the rear-side lubricating-oil supply passage provided at the rear wall portion of the transmission case therethrough.

13. The automatic transmission of claim 12, wherein a heat exchanger to conduct a heat exchange between the lubricating oil and water is attached to the converter case, and a lubricating-oil outlet of the heat exchanger connects to an upstream portion of said lubricating-oil introduction passage of the converter case.

14. The automatic transmission of claim 13, wherein the transmission case is configured such that a diameter of a front side thereof is greater than that of a rear side thereof, and said lubricating-oil supply pipe is disposed in a curve shape along an inner face of the transmission case to said lubricating-oil passage at said front side of the transmission case.

15. The automatic transmission of claim 14, wherein the transmission case has an opening at a peripheral face thereof which is near a disposition position of said lubricating-oil supply pipe.

16. The automatic transmission of claim 12, wherein the transmission case is configured such that a diameter of a front side thereof is greater than that of a rear side thereof, and said lubricating-oil supply pipe is disposed in a curve shape along an inner face of the transmission case and connected to said lubricating-oil passage at said front side of the transmission case.

* * * * *